May 1, 1934.     A. F. COLGREN     1,956,855
MEANS FOR DISSIPATION OF FRICTIONAL HEAT IN BRAKE DRUMS
Filed Aug. 15, 1931     2 Sheets-Sheet 1
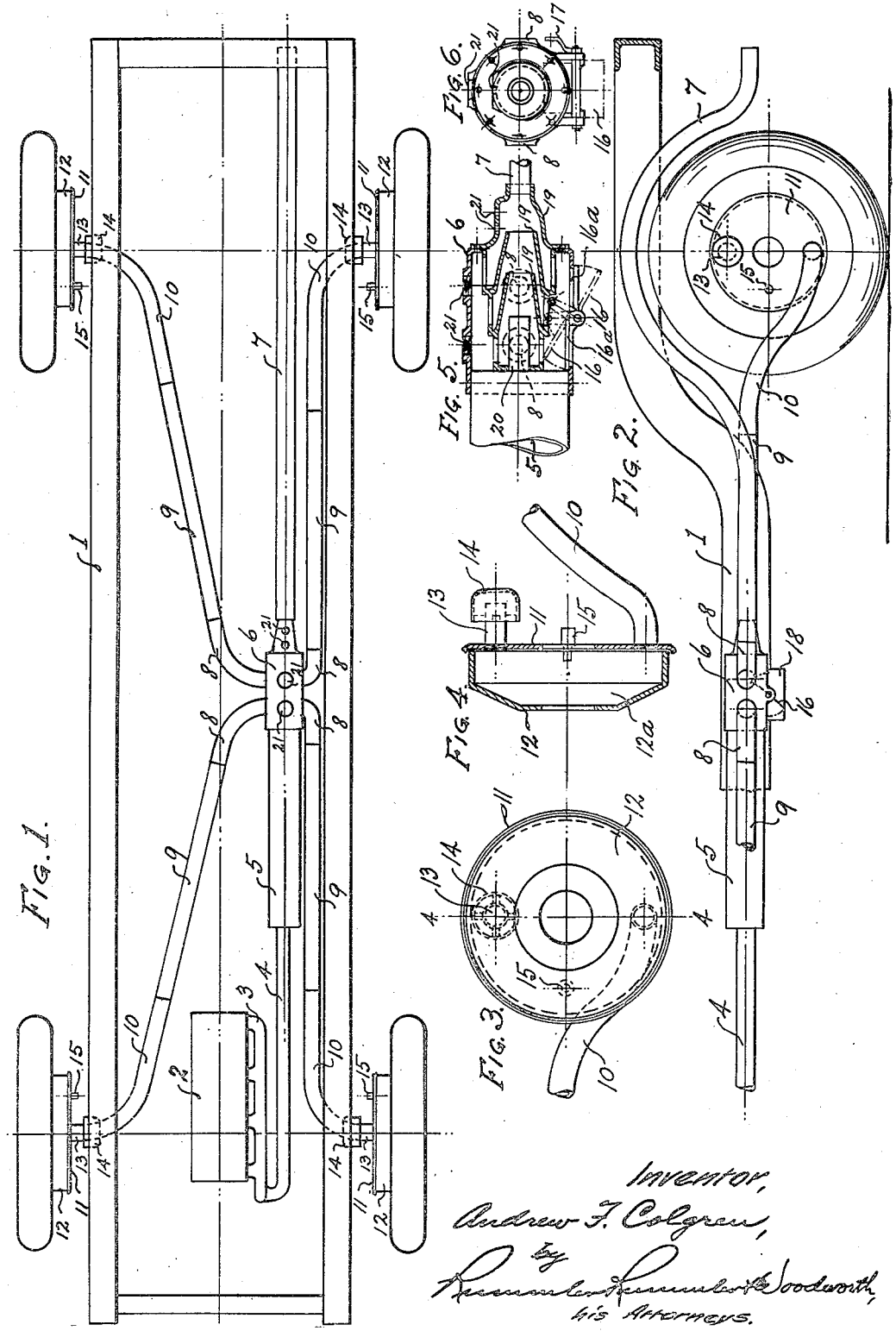

May 1, 1934. A. F. COLGREN 1,956,855
MEANS FOR DISSIPATION OF FRICTIONAL HEAT IN BRAKE DRUMS
Filed Aug. 15, 1931   2 Sheets-Sheet 2
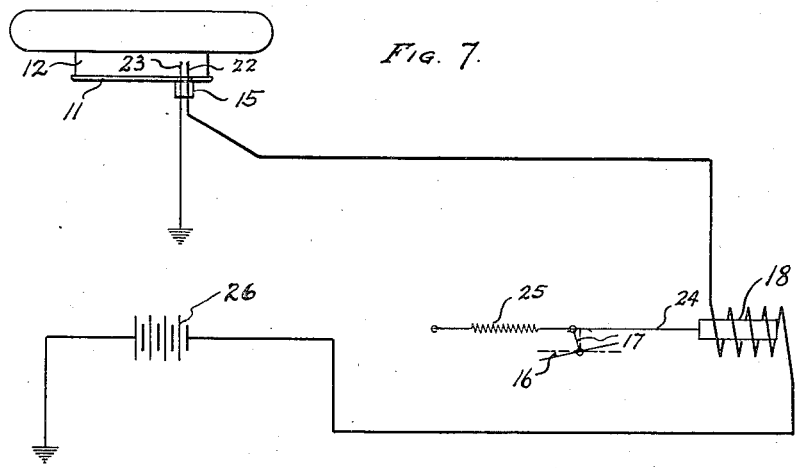
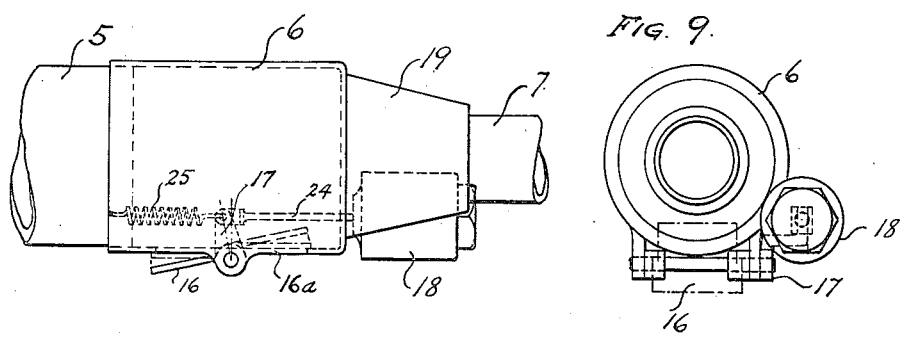
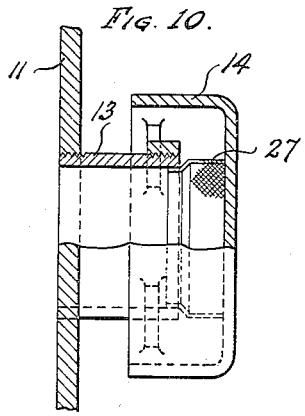
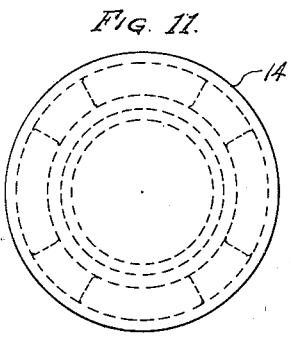

Patented May 1, 1934

1,956,855

UNITED STATES PATENT OFFICE 1,956,855

MEANS FOR DISSIPATION OF FRICTIONAL HEAT IN BRAKE DRUMS

Andrew F. Colgren, Chicago, Ill., assignor to Rummler, Rummler & Woodworth, Chicago, Ill.

Application August 15, 1931, Serial No. 557,410

4 Claims. (Cl. 188—264)

This invention relates to brakes. It is a method and means which can be employed in various ways to attain the same result namely, to prevent the building up of excessive frictional temperatures and also to dissipate the same from the brake drums of motor vehicles and other machines.

Conditions arising from excessive frictional heat created in braking devices, limit the effectiveness, reduce the efficiency, disrupt the operation of the device and otherwise destroy the life of the mechanism.

It is evident that any development or improvement which will mitigate or prevent dangerous conditions arising in such mechanisms is of great value and importance.

The conventional motor vehicle braking mechanism comprises a brake drum in the flange of which comes in close proximity to a fixed and stationary back-plate. The space or inclosure thus formed contains the brake shoes which are moved into and out of frictional contact with the friction surface on the flange of the rotating brake drum.

When the braking is continued over a rather long period of time, or if many successive applications of the brakes are made, frictional heat builds up sufficient to expand the drum beyond its normal diameter so that the reserve travel of the foot pedal is used up, as when the pedal goes down to the floor and the frictional contact becomes so slight that the braking effect is lost.

Now, if the interior of the brake drum can be kept reasonably cool under the stress of continued braking, then the mechanism will function properly at all times with maximum efficiency and without damage or destruction to any part of the assembly.

It is essential that the brake drum enclosure be as closely sealed as possible to exclude dust, grit and water, and for that reason mere holes or apertures in the sides of the drum or back-plate for the purpose of ventilation are not permissible.

Moving air is an excellent conductor of heat and a proportional quantity or volume of air will effectively carry off a great amount of generated heat. For example the walls of a heating furnace do not overheat because the circulating air absorbs the heat radiated by the furnace.

My invention consists in ventilating the brake drum enclosure and dissipating the generated heat in a positive and effective manner by inducing a strong current of air to enter and leave the brake drum inclosure without admitting dust, grit or water into the drum inclosure.

A device illustrating one embodiment of this invention is shown in the accompanying drawings, in which:

Figure 1 is a top plan of an automobile chassis.

Fig. 2 is a longitudinal elevation, partly broken away and partly in section of the mechanism shown in Fig. 1.

Fig. 3 is a side view of a brake drum and back-plate.

Fig. 4 is a sectional view of Fig. 3 on the line 4—4.

Fig. 5 is a sectional view of an exhauster apparatus fixed to the outlet end of an exhaust muffler.

Fig. 6 is an end view of Fig. 5.

Fig. 7 is a diagrammatic view showing the electric operating circuit.

Fig. 8 is an enlarged side view of an exhauster showing a by-pass valve and actuator.

Fig. 9 is an end view of the same.

Fig. 10 is a partially sectioned side view of an air inlet opening.

Fig. 11 is an end view of the same.

In the form shown in the drawings, an automobile chassis frame 1 having an internal combustion engine 2 and an exhaust manifold 3, leading through an exhaust pipe 4 to an exhaust muffler 5, is provided with an exhauster apparatus 6, positioned between the exhaust muffler 5 and a final outlet exhaust pipe 7. The exhauster apparatus 6 is provided with air conduit connections 8, each of which communicates through air ducts 9 and flexible tubes 10 to the inner space of a brake drum 12 through the brake drum back plate 11.

The brake drum 12 is provided with an air intake mounted on back plate 11 and comprising an outwardly projecting collar 13, having a hood or cap 14, which is spaced from the end of the air intake collar and which has a marginal flange spaced from the side walls of the collar and extending parallel thereto in overlapping relation.

A thermal switch 15 comprising a pair of contacts 22 and 23, is mounted on the back plate 11 of the brake drum 12. The contacts 22 and 23 extend into the inner space of the brake drum 12, one of the contacts being stationary and the other being carried on a bimetallic strip, which is actuated by varying temperature conditions within the brake drum space to move the respective contact toward or away from the stationary contact.

As shown in Fig. 8, the exhauster 6 is provided with a by-pass air inlet in which is mounted a butterfly valve 16. The butterfly valve 16 is mounted on a shaft having at one end a bell crank 17 by which the shaft is rotated to operate the valve 16.

At one end of the exhauster 6 is mounted a solenoid 18, which is connected to the bell crank 17 by means of a rod or shaft 24, and which is electrically operated by current from a storage battery 26, the circuit for which is opened and closed by the thermal switch 15 and its contacts 22 and 23. The bell crank 17 is also connected to a spring 25, which extends in the opposite direction from the rod 24, and which constantly urges the valve 16 to an open position so that when the electric circuit to the solenoid 18 is open, the valve 16 will be open.

As shown in Fig. 5, the exhauster 6 is provided with a plurality of concentrically juxtaposed nozzles 19, through which the exhaust gases from the engine 2 are forced by means of a nozzle 20 disposed at the outlet end of the muffler 5. The exhauster casing 6 is also provided with one or more inlets 21, which may be connected, if desired, to certain vacuum operated devices such as a vacuum cleaner, or to a grill in the occupant's part of the vehicle for ventilation purposes, neither of which is shown. These outlets may also be utilized to operate a windshield wiper, or a cigar and cigarette waste chute, also not shown.

As shown in Fig. 10 of the drawings, the air inlet connection on the back plate 11, which comprises an outwardly projecting collar 13 and an overlapping cap 14, arranged so as to provide a tortuous passage for the air entering the inlet collar 13, is also provided with a screen 27 mounted at the end of the inlet collar 13 so as to mechanically obstruct the passage of any foreign material such as dirt and dust. This arrangement is most effective and precludes the passage of water or moisture into the inner chamber of the brake drum 12. In such devices as the herein described invention, it is essential that no water or dust enter the brake drum chamber, because the entrance of such materials would cause inefficient operation of the brakes and their ultimate destruction.

When the motor 2, is in operation the exhaust gas from the muffler 5, passes through the exhauster apparatus 6, creating a partial vacuum therein. If the brake drums are cool the thermoswitches 15 will be in off position so that magnetic valve 18 (Fig. 2), will cause fly valve 16 to be in open position, allowing the atmospheric air to enter exhauster 6 through openings 16a. The said air will be dispelled through exhaust pipe 7 without any additional back pressure on the engine exhaust.

After heat has been generated in the brake drums, the thermoswitch 15 will actuate magnetic valve 18 (Fig. 2), causing fly valve 16 to close the openings 16a. In consequence a vacuum is created in the exhauster 6, inducing a strong current of air to flow in at orifice 13 and from and out of the brake drums through the air ducts 10, 9 and 8 into exhauster 6 and out through exhaust pipe 7. This action will continue until the drums are cool, when thermoswitches 15 will automatically open, due to the action of the bi-metallic strip carrying one of the contacts 22 or 23, and break the electrical circuit to the solenoid 18, so as to release the magnetic attraction thereof and allow the spring 25 to pull the bell crank back and close the butterfly valve 16.

As stated in the first paragraph, the desired result can be attained by various means for inducing an air current.

The invention is not confined to the mechanism herein shown and described except as limited by the claims.

I claim:

1. A device for dissipating frictional heat in brake drums, comprising a relatively stationary part forming a wall of the drum and a relatively rotary part forming an air chamber between the same, an air inlet aperture and an air outlet aperture on said stationary part and communicating with said air chamber through said stationary part, and an air conduit communicating with said outlet aperture and leading to an exhaust mechanism, said exhaust mechanism comprising concentrically juxtaposed nozzles communicating with an exhaust manifold and having a lateral port through which air is inductively extracted from said brake drum air chamber, through said air conduit, and means automatically operative to by-pass said air conduit.

2. A device for dissipating frictional heat in brake drums, comprising a relatively stationary part forming a wall of the drum and a relatively rotary part forming an air chamber between the same, an air inlet aperture and an air outlet aperture communicating with said air chamber through said stationary part, an air conduit communicating with said outlet aperture and with exhaust mechanism, said exhaust mechanism having an outside air intake and a valve for opening and closing said outside air intake.

3. A device for dissipating frictional heat in brake drums, comprising a relatively stationary part forming a wall of the drum and a relatively rotary part forming an air chamber between the same, an air inlet aperture and an air outlet aperture communicating with said air chamber through said stationary part, an air conduit communicating with said outlet aperture and with exhaust mechanism, said exhaust mechanism having an outside air intake and a valve for opening and closing said outside air intake, and thermostatic means communicating with said air chamber controlling the opening and closing of said valve.

4. In a device for dissipating frictional heat in brake drums, an inductive exhauster comprising an exhaust nozzle surrounded by a casing of larger diameter forming a chamber between the casing and exhaust nozzle and having an air inlet into said chamber, said chamber communicating with a brake drum, a valve for opening and closing said air inlet, and thermostatic means communicating with said brake drum controlling the opening and closing of said valve.

ANDREW F. COLGREN.